(12) United States Patent
Takeda et al.

(10) Patent No.: US 10,980,047 B2
(45) Date of Patent: Apr. 13, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/494,937

(22) PCT Filed: Mar. 23, 2017

(86) PCT No.: PCT/JP2017/011891
§ 371 (c)(1),
(2) Date: Sep. 17, 2019

(87) PCT Pub. No.: WO2018/173234
PCT Pub. Date: Sep. 27, 2018

(65) Prior Publication Data
US 2020/0037346 A1     Jan. 30, 2020

(51) Int. Cl.
*H04W 72/12*     (2009.01)
*H04L 5/00*      (2006.01)
*H04W 72/04*     (2009.01)

(52) U.S. Cl.
CPC ....... *H04W 72/1268* (2013.01); *H04L 5/0051* (2013.01); *H04L 5/0092* (2013.01); *H04W 72/0413* (2013.01); *H04W 72/1289* (2013.01); *H04W 72/0446* (2013.01)

(58) Field of Classification Search
CPC .............. H04L 5/0051; H04L 5/0092; H04W 72/0406; H04W 72/0413; H04W 72/042; H04W 72/1268; H04W 72/1289; H04W 72/0446
See application file for complete search history.

(56) References Cited

U.S. PATENT DOCUMENTS

2015/0282123 A1* 10/2015 Miao ................... H04L 5/0051
                                                    455/450
2018/0131490 A1*  5/2018 Patel .................. H04W 72/042

OTHER PUBLICATIONS

International Search Report issued in PCT/JP2017/011891 dated Jun. 20, 2017 (1 page).

(Continued)

*Primary Examiner* — Khoa Huynh
(74) *Attorney, Agent, or Firm* — Osha Bergman Watanabe & Burton LLP

(57) ABSTRACT

Even in the case of transmitting the uplink data and the demodulation reference signal using the short TTI, in order to appropriately control the UL transmission, according to one aspect of the present invention, a user terminal transmits a UL signal and a reference signal by using a predetermined sTTI among multiple sTTIs included in a slot, and controls the allocation of the UL signal and the reference signal based on a predetermined allocation pattern among multiple allocation patterns showing allocations of UL signals and reference signals. In these multiple allocation patterns, a UL signal and a reference signal are included in the same slot, and the reference signal is allocated to the same sTTI where the UL signal is allocated, or to an sTTI preceding the sTTI the UL signal is allocated.

7 Claims, 12 Drawing Sheets

(56) References Cited

OTHER PUBLICATIONS

Written Opinion of the International Searching Authority issued in PCT/JP2017/011891 dated Jun. 20, 2017 (4 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Extended European Search Report issued in counterpart European Patent Application No. 17901904.7, dated Oct. 28, 2020 (8 pages).
Ericsson; "On the operation with different TTI lengths"; 3GPP TSG-RAN WG1 #86 bis, R1-1610331; Lisbon, Portugal; Oct. 10-14, 2016 (8 pages).
CATT; "DMRS design for sPUSCH"; 3GPP TSG RAN WG1 Meeting #86bis, R1-1608746; Lisbon, Portugal; Oct. 10-14, 2016 (9 pages).
LG Electronics; "Discussion on sTTi designs for UL"; 3GPP TSG RAN WG1 Meeting #86bis, R1-1609219; Lisbon, Portugal; Oct. 10-14, 2016 (7 pages).

\* cited by examiner

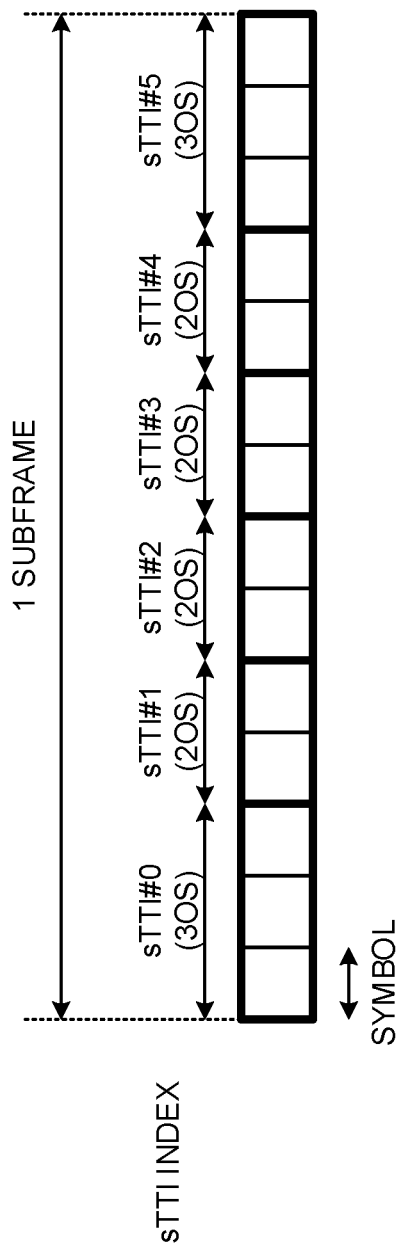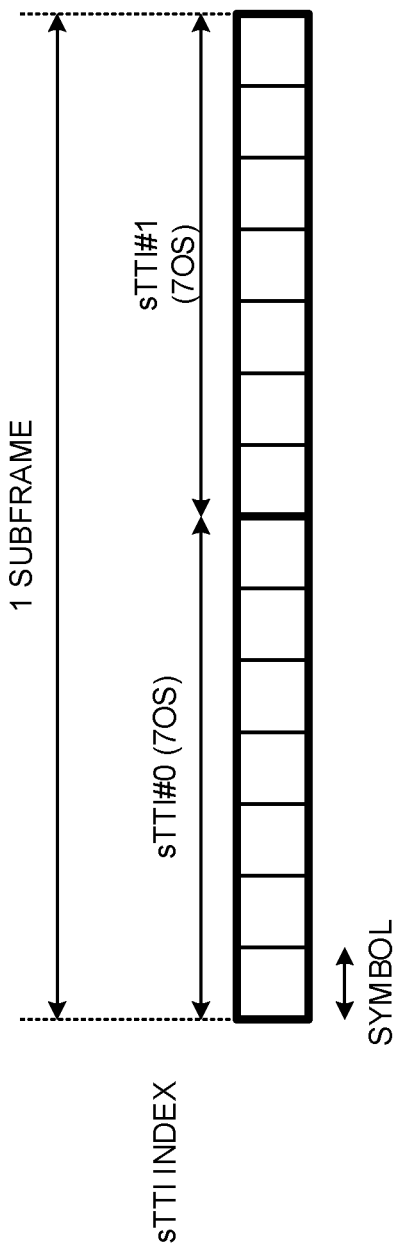

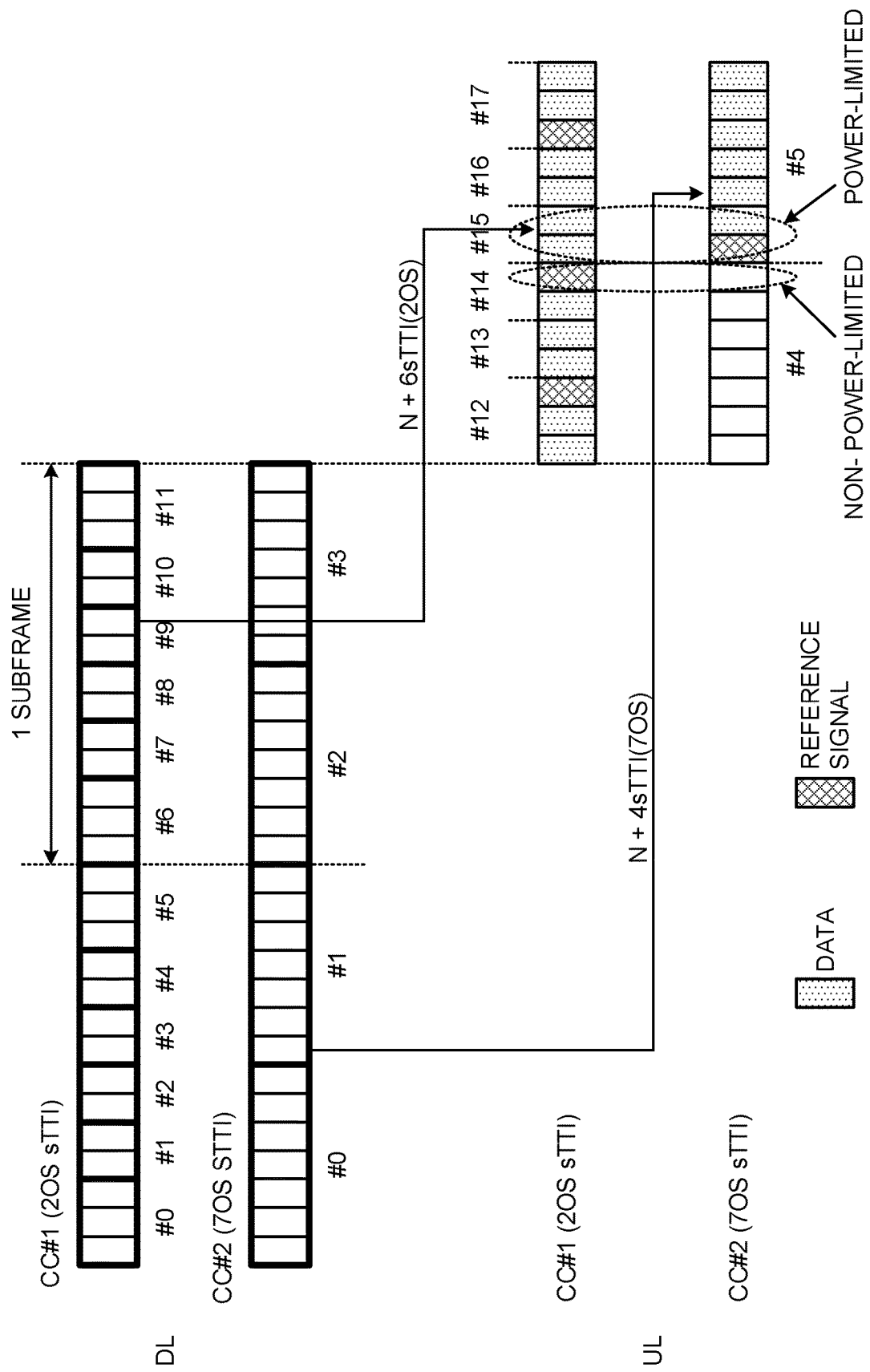

| 3-BIT FIELD | sTTI#0 | sTTI#1<br>sTTI#0, #1 | sTTI#2<br>sTTI#0, #1, #2 | sTTI#3 | sTTI#4<br>sTTI#3, #4 | sTTI#5<br>sTTI#3, #4, #5 |
|---|---|---|---|---|---|---|
| 000 | R D D | R - -, D D | R - -, - -, D D | R D | R -, D D | R -, - -, D D D(S) |
| 001 | D D R | - - R, D D | - - R, - -, D D | D R | - R, D D | - R, - -, D D D(S) |
| 010 | D R D | - R -, D D | - R -, - -, D D | Reserve | - -, R D | - -, R -, D D D(S) |
| 011 | Reserve | - - -, R D | - - -, - R, D D | Reserve | - -, D R | - -, - R, D D D(S) |
| 100 | Reserve | - - -, D R | - - -, - -, R D | Reserve | Reserve | - -, - -, R D D(S) |
| 101 | Reserve | Reserve | - - -, - -, D R | Reserve | Reserve | - -, - -, D R D(S) |
| 110 | Reserve | Reserve | Reserve | Reserve | Reserve | - -, - -, D D R |
| 111 | Reserve | Reserve | Reserve | Reserve | Reserve | Reserve |

FIG. 6

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and/or the like).

In existing LTE systems (for example, LTE Rel. 10 and later versions), carrier aggregation (CA) to integrate a number of carriers (component carriers (CCs), cells, and so forth) is introduced in order to achieve broadbandization. Each carrier is configured with the system bandwidth of LTE Rel. 8 as 1 unit. In addition, in CA, multiple CCs under the same radio base station (eNB (eNodeB)) are configured in a user terminal (UE (User Equipment)).

Meanwhile, in existing LTE systems (for example, LTE Rel. 12 and later versions), dual connectivity (DC), in which a number of cell groups (CGs) formed by different radio base stations are configured in a user terminal, is also introduced. Every cell group is comprised of at least 1 cell (CC, cell, etc.). In DC, since a number of CCs of different radio base stations are integrated, DC is also referred to as "inter-eNB CA."

In existing LTE systems (for example, in LTE Rel. 13 or earlier versions), downlink (DL) and/or uplink (UL) communication are carried out using 1-ms transmission time intervals (TTIs). This 1-ms TTI is the unit of time it takes to transmit 1 channel-encoded data packet, and is the processing unit in, for example, scheduling, link adaptation, retransmission control (HARQ-ACK (Hybrid Automatic Repeat reQuest-ACKnowledgment)) and so on. A TTI of 1 ms is also referred to as a "subframe," a "subframe duration" and so forth.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, 5G, NR, etc.) are expected to realize various radio communication services so as to fulfill varying requirements (for example, ultra high speed, large capacity, ultra-low latency, etc.). For example, NR is under study to provide radio communication services referred to as "eMBB (enhanced Mobile Broad Band)," "mMTC (massive Machine-Type Communication)," "URLLC (Ultra Reliable and Low Latency Communications)," and so on.

Now, envisaging future radio communication systems, studies are underway to introduce TTIs having different time lengths than the 1-ms TTIs of existing LTE (for example, LTE Rel. 8 to 13) (for example, TTIs that are shorter than 1-ms TTIs).

When a UE transmits a UL shared channel (for example, UL data) in a short TTI (sTTI), it is preferable to use a design in which the demodulation reference signal (DMRS (De-Modulation Reference Signal)) for use for demodulating data symbols is transmitted in at least one of before, during and after the sTTI.

Also, when UL data is transmitted using an sTTI, there is a possibility that the UL data and the DMRS are transmitted non-contiguously in the time direction (for example, in different sTTIs) depending on the configuration of the sTTI. However, existing LTE has no rules concerning sTTIs, and how to control the transmission of UL data and the DMRS corresponding to this UL data is a problem.

The present invention has been made in view of the above, and it is therefore an object of the present invention to provide a user terminal and a radio communication method, whereby UL transmission can be controlled properly even when uplink data and demodulation reference signals are transmitted using short TTIs.

Solution to Problem

A user terminal according to one aspect of the present invention has a transmission section that transmits a UL signal and a reference signal for use for demodulating the UL signal by using a predetermined sTTI, among a plurality of second time intervals (sTTIs) included in a first time interval (slot), and a control section that controls allocation of the UL signal and the reference signal based on a predetermined allocation pattern, out of a plurality of allocation patterns showing allocations of the UL signal and the reference signal, wherein, in the plurality of allocation patterns, the UL signal and the reference signal are included in a same slot, and the reference signal is allocated to a same sTTI in which the UL signal is allocated, or to an sTTI preceding the sTTI in which the UL signal is allocated.

Advantageous Effects of Invention

According to the present invention, even when uplink data and demodulation reference signals are transmitted using short TTIs, UL transmission can be controlled properly.

BRIEF DESCRIPTION OF DRAWINGS

FIGS. 1A and 1B provide diagrams to show examples of sTTI configurations;

FIG. 2 is a diagram to show an example of UL transmission using multiple CCs in which sTTIs are employed;

FIG. 6 is a diagram to show combinations of UL data and DMRSs according to a third example of the present invention;

DESCRIPTION OF EMBODIMENTS

Figure 3:
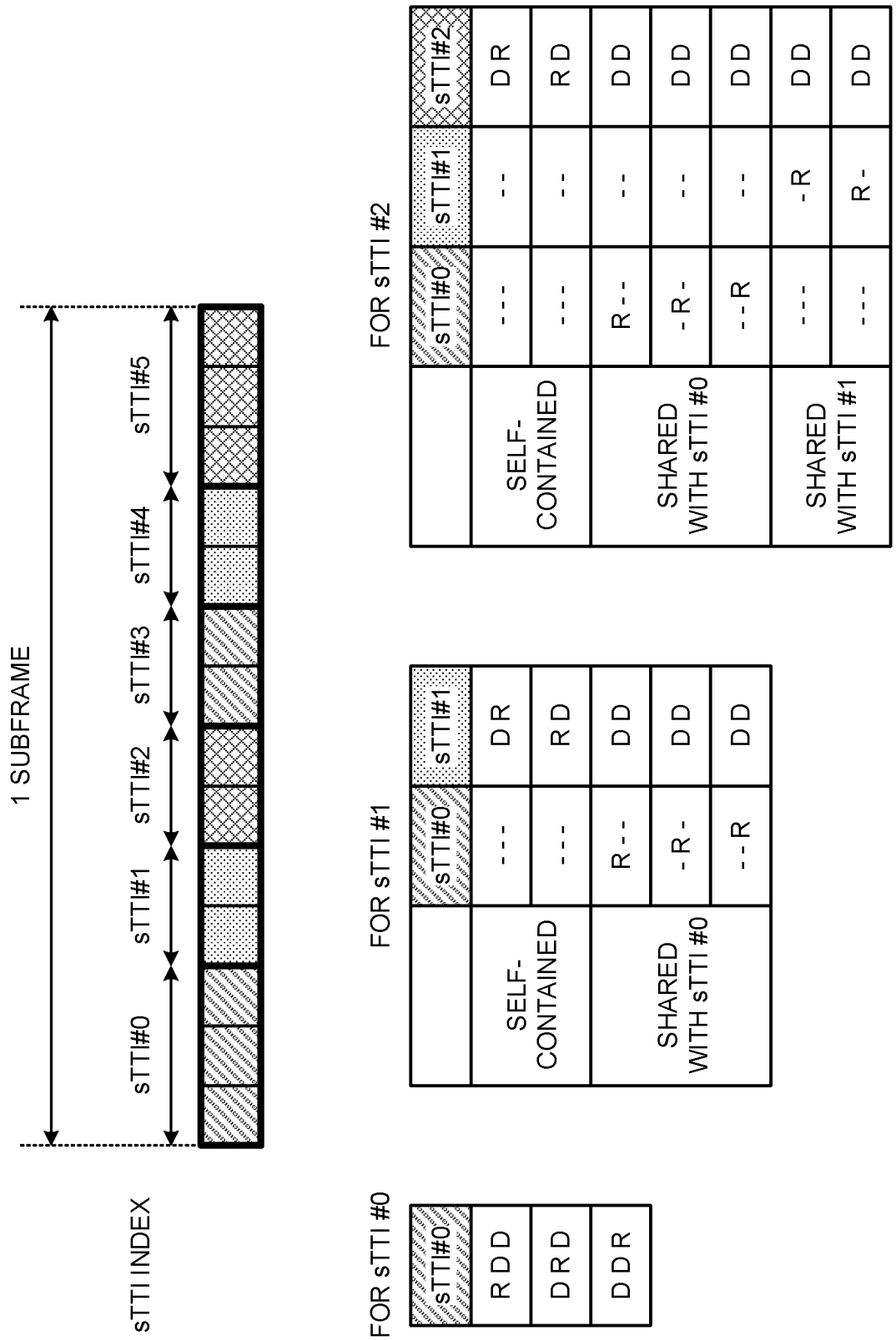
FIG. 3 is a diagram to show combinations of UL data and DMRSs in the first half according to the first example of the present invention.

To provide a method of reducing latency in communication in LTE, study is presently conducted to control transmission/receipt of signals by introducing shortened TTIs (sTTIs) having shorter durations than existing transmission time intervals (TTIs) (for example, subframes (1 ms)). Also, envisaging 5G/NR, study is in progress to allow a UE to use different services simultaneously. In this case, the duration of TTIs may be changed depending on services.

Note that a TTI may represent the time unit for use when transmitting/receiving transport blocks for transmitting/receiving data, code blocks and/or codewords. Assuming that a TTI is provided, the period of time (for example, the number of symbols) where the transport blocks, the code blocks and/or the codewords of data are actually mapped may be shorter than the TTI.

For example, when a TTI is formed with a predetermined number of symbols (for example, 14 symbols), the transport blocks, the code blocks and/or the codewords of transmitting/receiving data can be transmitted and received in 1 or a predetermined number of symbol periods among these. If the number of symbols in which transport blocks, code blocks and/or the codewords of transmitting/receiving data are transmitted/received is smaller than the number of symbols constituting the TTI, reference signals, control signals and so on can be mapped to symbols in the TTI where no data is mapped.

In this way, in either LTE or NR, both long TTIs and short TTIs may be used for transmission and/or receipt in UEs.

A long TTI refers to a TTI having a longer time length than a short TTI (for example, a TTI having a time length of 1 ms, like existing subframes (TTIs in LTE Rel. 8 to 13)), and may be referred to as a "normal TTI (nTTI)," a "1-ms TTI," a "normal subframe," a "long subframe," a "subframe," a "slot," a "long slot," etc. Furthermore, in NR, a long TTI may be referred to as a "TTI with a lower (smaller) subcarrier spacing" (for example, 15 kHz).

A long TTI, for example, has a time length of 1 ms, and is comprised of 14 symbols (in the event a normal cyclic prefix (CP) is used) or comprised of 12 symbols (in the event an enhanced CP is used). A long TTI may be suitable for services that do not require strict latency reduction, such as eMBB and MTC.

In existing LTE (for example, LTE Rel. 8 to 13), channels that are transmitted and/or received in TTIs (subframes) include a downlink control channel (PDCCH (Physical Downlink Control CHannel)), a downlink data channel (PDSCH (Physical Downlink Shared CHannel)), an uplink control channel (PUCCH (Physical Uplink Control CHannel)), a downlink data channel (PUSCH (Physical Uplink Shared CHannel)) and so on.

A short TTI refers to a TTI having a shorter time length than a long TTI, and may be referred to as a "shortened TTI," a "partial TTI (partial or fractional TTI)," a "shortened subframe," a "partial subframe," a "minislot," a "subslot" and so on. Also in NR, a short TTI may be referred to as a "TTI with a higher (larger) subcarrier spacing (for example, 60 kHz)."

A short TTI is comprised of, for example, fewer symbols (for example, 2 symbols, 7 symbols, and so on) than a long TTI, and the time length of each symbol (symbol duration) may be the same as that of a long TTI (for example, 66.7 μs). Alternatively, a short TTI may be comprised of the same number of symbols as a long TTI, and the symbol duration of each symbol may be shorter than in a long TTI.

FIG. 1 show examples of configurations of short TTIs. FIG. 1 show cases where 1 subframe (14 OFDM symbols) is segmented in a predetermined section, and a plurality of short TTIs are provided. In FIG. 1A, 1 subframe is segmented into 3, 2, 2, 2, 2 and 3 symbols, and short TTIs (sTTIs #0 to #5) are configured. sTTIs #0 and #5 are constituted by 3 symbols, and sTTI #1 to #4 are constituted by 2 symbols. This configuration is also referred to as "2-symbol sTTI" (also referred to as "2-OS sTTI," "2 OS (OFDM Symbol)," etc.). Alternatively, this configuration may be referred to as "sTTI configuration 1," "sTTI format 1," and so forth.

In FIG. 1B, 1 subframe is segmented into 7 symbols and 7 symbols, and short TTIs (sTTIs #0 to #1) are configured. sTTI #0 and #1 are constituted by 7 symbols. This configuration is also referred to as "7-symbol sTTI" (also referred to as "7-OS sTTI," "7 OS," etc.). Alternatively, this may be referred to as "sTTI configuration 2," "sTTI format 2," and so forth.

When using short TTIs, the time margin for processing (for example, coding, decoding, etc.) in UEs and/or base stations grows, so that the processing latency can be reduced. Also, when short TTIs are used, it is possible to increase the number of UEs that can be accommodated per unit time (for example, 1 ms). Short TTIs may be suitable for services that require strict latency reduction, such as URLLC.

A UE in which short TTIs are configured would use channels comprised of shorter time units than existing data and control channels. In LTE and NR, for example, as shortened channels to be transmitted and/or received in short TTIs, a shortened downlink control channel (sPDCCH (shortened PDCCH)), a shortened downlink data channel (sPDSCH (shortened PDSCH)), a shortened uplink control channel (sPUCCH (shortened PUCCH)) and a shortened downlink data channel (sPUSCH (shortened PUSCH)) and so on are under research.

It is now under study that data symbols of sPUSCH are mapped selectively in 1 short TTI. Preferably, the demodulation reference signal (DMRS) for use for demodulating the data symbols is transmitted in at least one of before, during and after this short TTI. That is, data symbols and DMRSs may be time-division-multiplexed (TDM (Time Division Multiplexing)) and allocated. Also, data symbols and DMRSs may be mapped to contiguous radio resources, and mapped to radio resources that are not contiguous (not adjacent) in the time and/or frequency domain.

However, how to allocate data and the reference signal for demodulating this data is not yet decided. If these can be allocated freely without restrictions, there is a possibility that problems may occur in communication quality.

For example, in future radio communication systems, UL transmission may be performed using a number of cells, including at least a cell in which short TTIs are employed. Carrier aggregation (CA) and/or dual connectivity (DC) are assumed to be possible forms of UL transmission to use multiple cells (CCs).

In this case, the TTI length may be configured differently among UL CCs used in CA and/or DC. For example, when a group that is subject to PUCCH transmission control (PUCCH group) is configured in CA, the same TTI length may be configured for the CCs in the same group, and different TTI lengths may be configured for CCs of different groups. Also, in DC, different TTI lengths can be configured for the master cell group (MCG) and each secondary cell group (SCG).

To be more specific, the first TTI length (for example, 1 ms) may be applied to first UL CC #1, and a second TTI length (for example, 2-OS sTTI) may be applied to second UL CC #2. Alternatively, the first TTI length (for example, 2-OS sTTI) may be applied to first UL CC #1, and a second TTI length (for example, 7-OS sTTI) may be applied to second UL CC #2.

In addition, presuming DMRS-multiplexing based on IFDMA (Interleaved Frequency Division Multiple Access), studies are in progress to amplify the power of DMRSs (EPRE (Energy Per Resource Element)) so as to apply the same transmission power to DMRS symbols and data symbols (power boosting). In this way, it is a possibility to configure the same transmission power for UL data and the DMRS for demodulating this UL data.

However, when UL transmission is performed by using short TTIs, depending on the configuration of these short TTIs and so on, UL data and the DMRS may be allocated non-contiguously in the time direction (for example, allocated to different sTTIs). When UL transmission is carried out using a number of cells, the total value of a UE's UL transmission power requested from the radio base station may exceed a predetermined value in a given transmission period (for example, a predetermined symbol, a predetermined sTTI, etc.), and the UL transmission power may be limited ("power-limited"). In this case, it may be difficult to in fact apply the same transmission power to the UL data and the DMRS that are transmitted in non-contiguous or different sTTIs.

FIG. 2 shows a case where signals are transmitted and received using 2 CCs where different TTI lengths are used. In the case shown here, 2-OS sTTIs is used in UL and DL in CC #1, and 7-OS sTTIs are used in UL and DL in CC #2. Note that, in CC #1, 1 subframe (14 OFDM symbols) is segmented into 3, 2, 2, 2, 2 and 3 symbols, including periods where an sTTI is comprised of 3 symbols (OSs are constituted by 3 symbols).

FIG. 2 shows a case where, in CC #1, a UL signal (for example, UL data) in response to a DL signal (for example, UL grant) is transmitted at the timing of N+6 sTTIs (of 2 OSs). Also, in the case shown here, in CC #2, a UL signal in response to a DL signal is transmitted at the timing of n+4 sTTIs (of 7 OSs). In this manner, the timing for transmitting a UL signal in response to a DL signal can be configured based on the length of TTIs. Note that the timing for transmitting a UL signal in response to a DL signals is by no means limited to this.

When UL data is transmitted by using sTTIs (for example, 2-OS sTTIs), UL data and the DMRS for demodulating this UL data may be allocated non-contiguously (for example, in different sTTIs). For example, when UL data is transmitted by using the sTTI at the head of a slot (for example, by using sTTI #15 (of 2 OSs) in FIG. 2), it may be possible to demodulate the UL data by using the DMRS transmitted in an sTTI before this sTTI (for example, sTTI #14 (of 2 OSs) in FIG. 2). In this case, the DMRS and the UL data are allocated across slots.

Furthermore, in FIG. 2, in CC #2, the allocation of UL data is controlled in units of 7 symbols (in units of slots). Therefore, as shown in FIG. 2, cases might occur where UL transmission is not performed in a certain slot (for example, sTTI #4 (of 7 OSs)), but where UL transmission is performed in the next slot (for example, sTTI #5 (of 7 OSs)). Here, sTTI #14 of CC #1 (of 2 OSs) overlaps with sTTI #4 of CC #2 (of 7 OSs), and sTTI #15 of CC #1 (of 2 OSs) overlaps with sTTI #5 of CC #2 (of 7 OSs).

In this case, in CC #1, UL data (sTTI #15 (of 2 OSs)) that overlaps a UL signal of CC #2 is power-limited, but the DMRS (sTTI #14 (of 2 OSs)) for use for demodulating this UL data may not be power-limited. In this case, it may not be possible to transmit the UL data and the DMRS with the same transmission power. This leads to a possibility that the radio base station is unable to demodulate the UL data properly by using the DMRS, and the quality of communication may be degraded.

When UL data is transmitted by using sTTIs (for example, 2-OS sTTIs), there may be cases where a DMRS and UL data are allocated across subframes. Therefore, even when UL transmission is performed by using CC #1, which uses a predetermined TTI length (for example, 2 OSs), and CC #2, which uses subframes (of 1 ms), one of the UL data and the DMRS may be power-limited, as shown in FIG. 2.

So, the present inventors have come up with the idea of controlling transmission so as not to allow performing demodulation by using DMRSs across subframes and/or slots. That is, UL data and the DMRS for use for demodulating this UL data are controlled not to be allocated to different subframes and/or different slots. In addition, the present inventors have come up with the idea of allocating a DMRS in the same sTTI where the corresponding UL data is allocated (this kind of allocation is also referred to as "self-contained"), or allocating a DMRS in an sTTI that precedes the sTTI where the corresponding UL data is allocated (also referred to as "shared" or "multiplexed"). By this means, it is possible to reduce the delays caused by channel estimation and the like.

Now, embodiments of the present invention will be described in detail below with reference to the accompanying drawings. According to the herein-contained embodiments, a short TTI (sTTI) can be configured in any way as long as its time length is shorter than that of a long TTI (1 ms). Although examples in which a short TTI is comprised of fewer symbols than a long TTI, and in which each symbol has the same symbol duration as that of a long TTI will be described below, these example can be adequately applied even when a short TTI adopts a symbol duration that is different from that of a long TTI. Note that the examples that will be described below may be applied individually or may be applied in combination. Also, each example below will be the rule that channel estimation to use DMRSs across subframes and/or slots is not performed (rule 1), and/or the rule that channel estimation is not performed using DMRSs allocated to sTTIs behind the sTTI the corresponding UL data is allocated (rule 2) is also applied.

First Example

A first example of the present invention will illustrate a user terminal with a transmission section that transmits a UL signal and a reference signal for use for demodulating the UL signal by using a predetermined sTTI, among a plurality of second time intervals (sTTIs) included in a first time interval (slot), and a control section that controls the allocation of the UL signal and the reference signal based on a predetermined allocation pattern out of a plurality of allocation patterns showing allocations of UL signals and reference signals. In these multiple allocation patterns, a UL signal and a reference signal are included in the same slot, and the reference signal is allocated to the same sTTI where the UL signal is allocated, or to an sTTI preceding the sTTI the UL signal is allocated. In the following description, a slot will be exemplified as a first time interval, and an sTTI will be exemplified as a second time interval, but other time intervals apart from the first time interval and/or the second time interval may be used as well.

Figure 4:
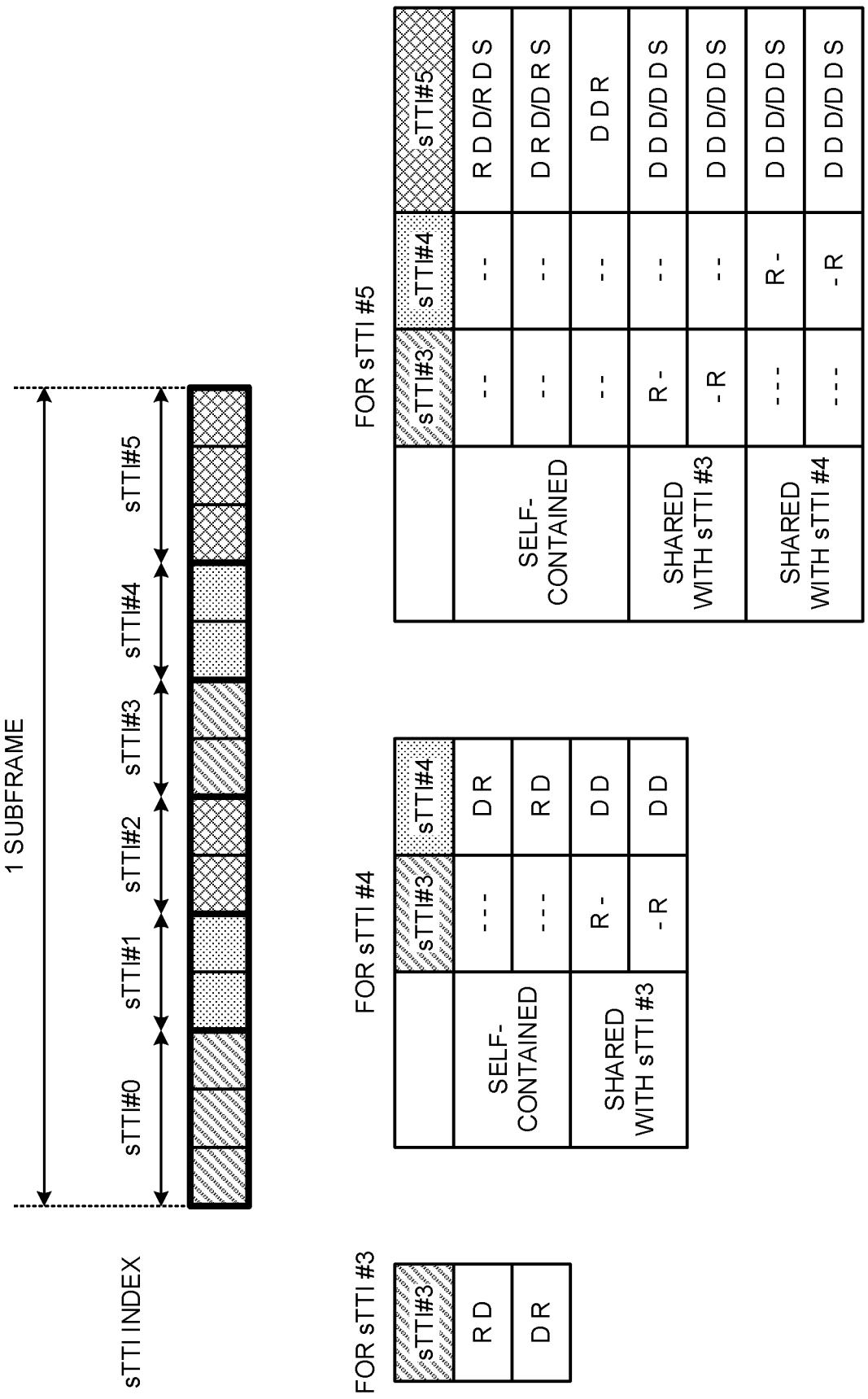
FIG. 4 is a diagram to show combinations of UL data and DMRSs in the second half according to the first example.

FIG. 3 and FIG. 4 are diagrams to show allocation patterns of UL data and DMRSs. A user terminal controls the allocation of UL data and DMRSs based on these allocation patterns. As in FIG. 1A, 1 subframe is segmented into 3, 2, 2, 2, 2 and 3 symbols, and short TTIs (sTTIs #0 to #5) are configured. sTTIs #0 and #5 are constituted by 3 symbols, and sTTI #1 to #4 are constituted by 2 symbols. sTTI #0 to sTTI #2 constitute the first slot, and sTTI #3 to sTTI #5 constitute a second slot.

Based on the above-noted allocation patterns, the user terminal selects the symbols to allocate UL data and DMRSs to. Given that a slot boundary is present between sTTI #2 and sTTI #3, rules that channel estimation to use DMRSs over this slot boundary is not performed, and that channel estimation is not performed by using a DMRS that is allocated to an sTTI behind the sTTI where the corresponding UL data is allocated, are adopted.

First, allocation patterns supported by sTTI #0 to sTTI #2 included in the first slot (first-half slot) will be described.

The following 3 patterns are supported as allocation patterns for UL data and DMRS that can be applied to sTTI #0 (see FIG. 3). To be more specific, all or any of the 3 patterns (R, D, D) (D, R, D) and (D, D, R) are supported in the order of symbols that constitute sTTI #0. R stands for DMRS, and D stands for UL data. The same will hold hereinafter. sTTI #0 uses a self-contained allocation pattern, in which UL data and the DMRS for use for demodulating this UL data are allocated in the same sTTI. In other words, a DMRS is always allocated to the first sTTI in a slot. For example, if the allocation pattern (R, D, D) is applied to sTTI #0, the user terminal allocates the DMRS (R) for demodulating the UL data (D) allocated to the second symbol and the third symbol of sTTI #0, to the first symbol.

The allocation patterns that can be applied to sTTI #1 are defined in combination with the allocation patterns for preceding sTTI #0 (reference signal only). The allocation patterns that can be applied to sTTI #2 are comprised of 2 self-contained allocation patterns and 3 shared allocation patterns (see FIG. 3). The self-contained allocation patterns support one or both of (D, R) and (R, D), in the order of symbols that constitute sTTI #1.

The shared allocation patterns each define a pattern in which the DMRS included in the allocation patterns supported by preceding sTTI #0 is shared with the UL data of sTTI #1. Since the DMRS is multiplexed in a shared allocation pattern, a shared allocation pattern may be referred to as "DMRS multiplexing (pattern)."

To be more specific, as shown in FIG. 3, (D, D) is always assigned to 2 symbols in sTTI #1, and the allocation pattern is defined in combination with the DMRS (R, -, -), (-, R, -) and (-, -, R) supported in preceding sTTI #0. For example, when the allocation patterns (R, -, -) and (D, D) are applied to sTTI #1, the user terminal uses the DMRS allocated in the first symbol of sTTI #0 as the DMRS (R) for demodulating the UL data (D) allocated to first and second symbols of sTTI #1.

The allocation patterns that can be applied to sTTI #2 are defined in combination with the allocation patterns for preceding sTTI #0 and sTTI #1 (reference signal only). These allocation patterns are comprised of 2 self-contained allocation patterns, 3 shared allocation patterns with preceding sTTI #0 and 2 shared allocation patterns with preceding sTTI #1 (see FIG. 3).

The self-contained allocation patterns support one or both of (D, R) and (R, D), in the order of symbols that constitute sTTI #2. The shared allocation patterns with preceding sTTI #0 each define a pattern in which the DMRS included in the allocation patterns supported by preceding sTTI #0 is shared for the UL data of this sTTI #2.

To be more specific, as shown in FIG. 3, (D, D) is always assigned to 2 symbols in sTTI 2, and the allocation pattern is defined in combination with the DMRS (R, -, -), (-, R, -) and (-, -, R) supported in preceding sTTI #0. The same applies to the shared allocation patterns with preceding sTTI #1.

First, allocation patterns supported by sTTI #3 to sTTI #5, included in the second slot (second-half slot) will be described.

sTTI #3 is again the top sTTI of the slot. On assumption channel estimation to use DMRSs across subframes and/or slots is not performed (rule 1), the sTTIs included in the second slot support the same allocation patterns as those supported in the first slot, independently of the DMRSs allocated in the first slot.

The following 2 patterns are supported as allocation patterns for UL data and DMRS that can be applied to sTTI #3 (see FIG. 4). To be more specific, the 2 patterns (R, D) and (D, R) are supported in the order of symbols that constitute sTTI #3. In sTTI #3, UL data and the DMRS for use for demodulating this UL data are allocated in the same sTTI. In other words, a DMRS is always allocated to the first sTTI in a slot.

The allocation patterns that can be applied to sTTI #4 are defined in combination with the allocation patterns for preceding sTTI #3 (reference signal only). These allocation patterns are comprised of 2 patterns of self-contained allocation patterns and 2 patterns of shared allocation patterns (see FIG. 4). The self-contained allocation patterns support one or both of (D, R) and (R, D), in the order of symbols that constitute sTTI #4. The shared allocation patterns each define a pattern in which the DMRS included in the allocation patterns supported by preceding sTTI #3 is shared with the UL data of this sTTI #4.

The allocation patterns that can be applied to sTTI #5 are defined in combination with the allocation patterns for preceding sTTI #3 and sTTI #4 (reference signal only). These allocation patterns are comprised of 3 patterns of self-contained allocation patterns, 2 patterns of shared allocation patterns with preceding sTTI #3, and 2 patterns of shared allocation patterns with preceding sTTI #4 (see FIG. 4).

The self-contained allocation patterns support one or all of (R, D, R or R, D, S), (D, R, D or D, R, S) and (D, D, R), in the order of symbols that constitute sTTI #5. S stands for SRS (Sounding Reference Signal). When an SRS is allocated to the last symbol in a subframe, patterns in which S (SRS), not D (UL data), is allocated are used. The shared allocation patterns each define a pattern in which the DMRS included in the allocation patterns supported by preceding sTTI #3 is shared with the UL data of this sTTI #5.

To be more specific, as shown in FIG. 4, (D, D, D or D, D, S) is always assigned to 2 symbols in sTTI #2, and the allocation pattern is defined in combination with the DMRS (R, -) and (-, R) supported in preceding sTTI #3. The same applies to the shared allocation patterns with preceding sTTI #4.

Second Example

A second example of the present invention provides a method of sending signaling so as to indicate the allocation patterns of UL data and DMRSs, which have been described above with the first example, to a user terminal. In the second example, higher layer signaling and/or downlink control information (UL grant included in DCI) are used to indicate allocation patterns to a user terminal.

The user terminal may presume that one or more allocation patterns based either on self-contained DMRSs or shared DMRSs, or multiple allocation patterns that include both self-contained DMRSs and shared DMRSs, will be indicted via higher layer signaling. Which one of self-contained DMRSs and shared DMRSs are suitable varies depending on the situation. So, depending on the situation, the base station indicates the more preferable DMRS allocation between self-contained DMRS and shared DMRS, to the user terminal, by way of higher layer signaling.

Now, a case will be assumed below where self-contained DMRSs are indicated to a user terminal by way of higher layer signaling. When a user terminal is commanded to use self-contained DMRSs alone, it then follows that signaling for sharing the DMRS included in a preceding sTTI, as is the case when a shared DMRS is used, is no longer necessary.

Therefore, when there is a command to use only self-contained DMRSs, the indicator field to indicate the DMRS included in a preceding sTTI can be deleted from the DL signal (DCI). If there is a command to use only self-contained DMRSs, the base station uses DCI, from which the indicator field to indicate the DMRS included in a preceding sTTI is deleted.

On the other hand, if a configuration to allow the use of self-contained DMRSs alone, the user terminal performs blind detection of DCI based on the number of DCI bits that is calculated based on the assumption that no indicator field to indicates the DMRS included in a preceding sTTI is not included in the DCI. Thus, the overhead of signaling related to DMRS allocation patterns can be reduced.

As shown in FIG. 3 and FIG. 4, the allocation patterns for sTTI #0, namely (R, D, D), (D, R, D) and (D, D, R), are self-contained allocation patterns. For other sTTIs such as sTTI #1, self-contained DMRS allocation patterns are also defined.

Also, there is a high likelihood that an allocation pattern that applies in common to the 3-symbol-sTTIs of the first slot and the second slot is included. A case will be assumed here where the same allocation pattern is configured for the 3-symbol-sTTI in the first slot and the second slot.

If there are sTTIs to which the same self-contained DMRS allocation patterns are applied between the first slot and the second slot, the user terminal may be commanded, via higher layer signaling, to select and use one of these allocation patterns. For example, if (R, D, D) and (D, R, D) are supported as self-contained DMRS allocation patterns that are the same between the first slot and the second slot, a command to select and use one of these allocation patterns may be given via higher layer signaling.

Furthermore, it is assumed that different allocation patterns are applied to the 3-symbol-sTTI in the first slot and the second slot. Alternatively, allocation patterns to apply to the 3-symbol-sTTI in the first slot and allocation patterns to apply to the 3-symbol-sTTI in the second slot may be defined separately, and an allocation pattern may be selected out of these and used for each slot. For example, if (R, D, D), (D, R, D) and (D, D, R) are defined as allocation patterns to apply to the 3-symbol-sTTI in the first slot, an allocation pattern selected from these is used in the first slot. 3 patterns of DMRS locations can be selected for the 3-symbol-sTTI of the first slot.

Meanwhile, if (R, D, D) and (D, R, D) are defined as allocation patterns to apply to the 3-symbol-sTTI of the second slot, an allocation pattern selected from these is used in the second slot. For the 3-symbol-sTTI of the second slot, only 2 patterns of DMRS locations can be selected. For the 3-symbol-sTTI of the second slot, the SRS may be allocated because the DMRS is not allocated to the final symbol.

Next, a case will be assumed below where a shared DMRS is configured by higher layer signaling. When a shared DMRS is indicated to a user terminal, the base station places the allocation pattern of UL data and the DMRS in the indicator field of a UL grant, and reports this to the user terminal. The indicator field that indicates the allocation pattern of UL data and the DMRS is comprised of 2 bits or 3 bits, for example.

The user terminal may change the interpretation of the indicator field in a UL grant depending on the sTTI this UL grant schedules. By linking the interpretation of the bit data provided in the indicator field with the scheduled sTTI, it is possible to use complex allocation patterns in an efficient way. For example, even if the bit data provided in the indicator field is the same, the allocation pattern of UL data and the DMRS can be changed depending on the sTTI that is scheduled.

Also, if a self-contained DMRS or a shared DMRS is configured via higher layer signaling, the user terminal does not presume scheduling in which a DMRS and UL data are transmitted simultaneously in the same symbol (SC-FDMA symbol). Alternatively, the user terminal does not presume scheduling in which 2 DMRSs are transmitted simultaneously using different resources (for example, frequency resources) on the same symbol (SC-FDMA symbol). Then, when the user terminal receives a UL grant that commands simultaneous transmission of a DMRS and UL data in the same symbol or simultaneous transmission of 2 DMRSs, the user terminal overwrites the previous UL grant command with the latest UL grant command.

Now, with reference to the table shown in FIG. 5, a second example will be described in detail below. sTTI allocation patterns are shown in association with the indicator field (2 bits) of UL grants. The allocation patterns indicated in the indicator field (2 bits) support shared DMRSs. sTTI #1 and sTTI #4 can partly designate self-contained DMRS allocation patterns, and sTTI #2 and sTTI #5 cannot indicate self-contained DMRS allocation patterns.

sTTI #2 of the first slot, which is a 2-symbol-s TTI, all allocation patterns are defined based on a shared DMRS. For example, the indicator field=00 indicates allocation patterns of (R, -, -), (-, -) and (D, D) with respect to sTTI #2. sTTI #0 to sTTI #2 are arranged in order. For example, the indicator field=00 indicates allocation patterns of (R, -, -) and (D, D) with respect to sTTI #1. sTTI #0 and sTTI #1 are arranged in order. In this way, even when the bit data provided in the indicator field is the same, different allocation patterns are indicated depending on the sTTI.

The DL subframes and UL subframes shown in FIG. 5 will be described in detail below. In the first slot, the indicator field=00 is signaled for sTTI #0, the indicator field=11 is signaled for sTTI #1, and the indicator field=11 is signaled for sTTI #2.

Since the indicator field=00 is indicated for sTTI #0, the user terminal allocates UL data and a DMRS to the 3 symbols of sTTI #0 based on the allocation pattern (R, D, D). Also, given that the indicator field=11 is indicated for sTTI #1, the user terminal allocates (R, D) to 2 symbols of sTTI #1 in order. Also, given that the indicator field=11 is indicated for sTTI #2, the user terminal allocates (D, D) to 2 symbols of sTTI #2 in order.

At this time, if the indicator field=10 is indicated for sTTI #2, the DMRS is allocated upon the UL data allocated to the second symbol of sTTI #1. As described above, scheduling that transmits UL data and a DMRS simultaneously in the same symbol is not presumed here. Even if the user terminal receives a UL grant to indicate simultaneous transmission of a DMRS and UL data in the same symbol, the user terminal can control the transmission of the DMRS and UL data based on the command of a specific UL grant. For example, by overwriting the command of the previous UL grant with the latest UL grant command, more flexible scheduling can be realized.

Referring to the second slot, the indicator field=00 is signaled for sTTI #3, the indicator field=10 is signaled for sTTI #4, and the indicator field=10 is signaled for sTTI #5. As in the first slot, UL data and DMRSs are allocated based on these allocation patterns.

Third Example

A third example of the present invention will illustrate a case where a UL grant's indicator field can indicate either a self-contained DMRS or a shared DMRS. A UL grant may schedule 1 sTTI independently, or a UL grant may schedules a number of sTTIs together.

Figure 5:
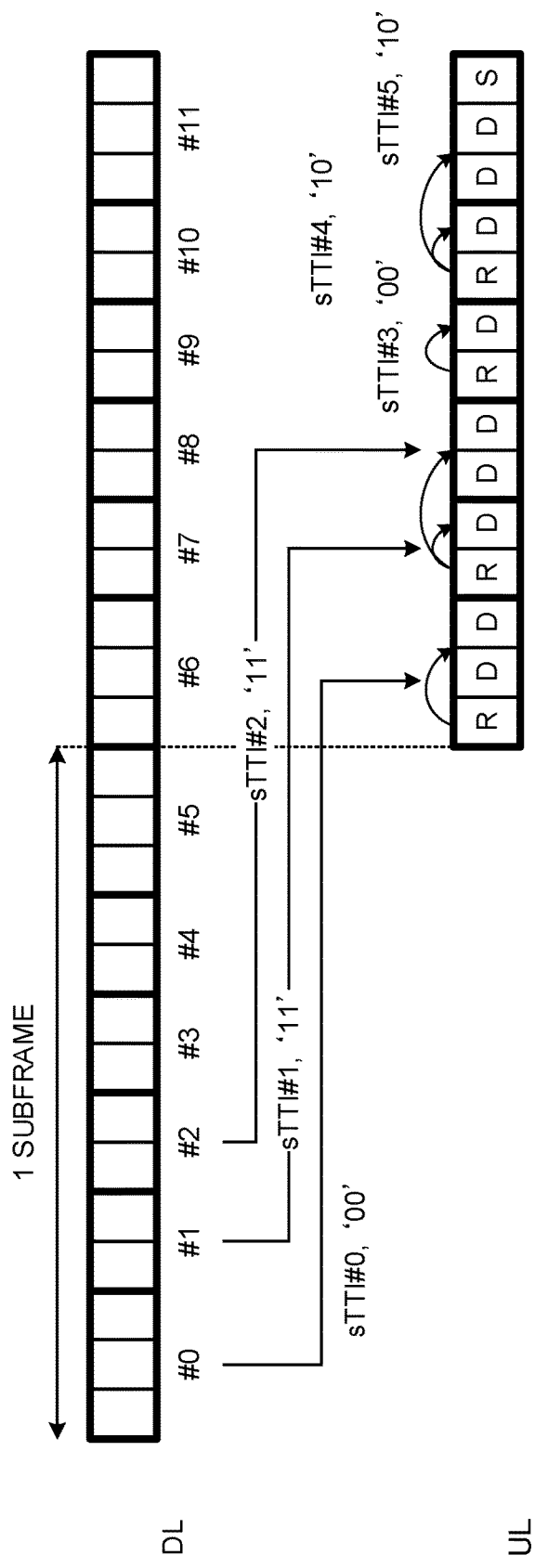
FIG. 5 is a diagram to show combinations of UL data and DMRSs according to a second example of the present invention.

FIG. 6 shows sTTI allocation patterns in association with the indicator field of UL grants, and the configurations of sTTIs shown here are the same as the configurations of sTTIs shown in FIG. 5. The indicator field is configured 3-bits long. Self-contained DMRS allocation patterns and shared DMRS allocation patterns are defined per sTTI, in association with the bit data of the indicator field.

According to the third example, shared DMRS allocation patterns and self-contained DMRS allocation patterns can be designated for all of sTTI #0 to sTTI #5 included in 1 subframe.

For example, the bit data indicated in the indicator field, namely, 000, 001, 010, 011 and 100, define shared DMRS allocation patterns for sTTI #2, and the bit data=101 and 110 define self-contained DMRS allocation patterns for sTTI #2. If the bit data=000 is indicted for sTTI #2, only UL data is allocated to sTTI #2, and a self-contained allocation pattern to share the DMRS of preceding sTTI #0 is selected. Also, if the bit data=101 is indicated for sTTI #2, a shared allocation pattern to allocate UL data and a DMRS to sTTI #2 is selected.

Also, if a self-contained DMRS or a shared DMRS is configured by a UL grant, the user terminal does not presume scheduling in which a DMRS and UL data are transmitted simultaneously in the same symbol (SC-FDMA symbol). Alternatively, the user terminal does not presume scheduling in which 2 DMRSs are transmitted simultaneously on the same symbol (SC-FDMA symbol). Even if the user terminal receives a UL grant to indicate simultaneous transmission of a DMRS and UL data in the same symbol, the user terminal can control the transmission of the DMRS and UL data based on the command of a specific UL grant. For example, by overwriting the command of the previous UL grant with the latest UL grant command, more flexible scheduling can be realized.

Note that, in the third example and in FIG. 6, the UL grants scheduled in all sTTIs include allocation pattern indicator fields that are comprised of the same number of bits, but the number of bits can be changed depending on the sTTI scheduled. For example, referring to the example of FIG. 6, 2 allocation patterns are available for choice for sTTI #3, and, for sTTI #0 and sTTI #4, 4 or fewer allocation patterns are available for choice. Therefore, the number of bits of this field may be 1 in the UL grant scheduled in sTTI #3, and the number of bits of this field may be 2 in the UL grants scheduled in sTTI #0 and sTTI #4. In this case, the overhead of UL grants can be reduced depending on which in which sTTIs the UL grants are scheduled.

(Radio Communication System)

Now, the structure of a radio communication system according to the present embodiment will be described below. In this radio communication system, the radio communication methods according to the above-described embodiments are employed. Note that the radio communication method according to each embodiment described above may be used alone or may be used in combination.

Figure 7:
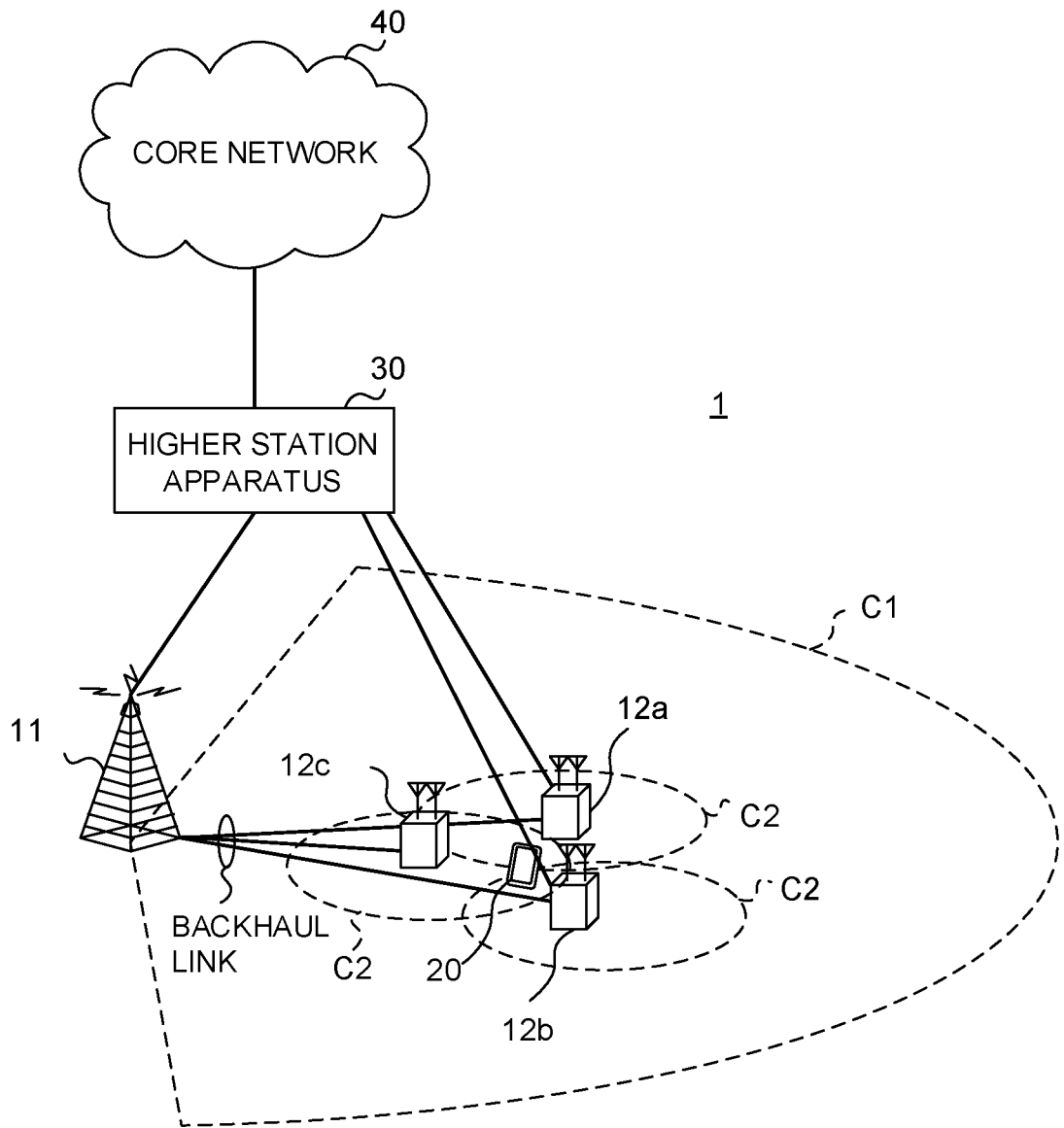
FIG. 7 is a diagram to show an exemplary schematic structure of a radio communication system according to the present embodiment.

FIG. 7 is a diagram to show an example of a schematic structure of a radio communication system according to present embodiment. A radio communication system 1 can adopt carrier aggregation (CA) and/or dual connectivity (DC) to group a plurality of fundamental frequency blocks (component carriers) into 1, where the LTE system bandwidth (for example, 20 MHz) constitutes 1 unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure may be adopted here in which different numerologies (for example, different TTI lengths, and/or processing times, and so on) are used between cells. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells. Note that a structure may be employed here in which an FDD carrier and/or a TDD carrier, which use shortened TTIs, may be included in one of the cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that frequency bands that are used in each radio base station are by no means limited to these structures.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL.

In the radio communication system 1, a DL data channel (PDSCH (Physical Downlink Shared CHannel), also referred to as a DL shared channel and/or the like), which is used by each user terminal 20 on a shared basis, a broadcast channel (PBCH (Physical Broadcast CHannel)), L1/L2 control channels and so on are used as DL channels. User data, higher layer control information and SIBs (System Information Blocks) are communicated in the PDSCH. Also, the MIB (Master Information Block) is communicated in the PBCH.

The L1/L2 control channels include a DL control channel (a PDCCH (Physical Downlink Control CHannel), an EPDCCH (Enhanced Physical Downlink Control CHannel)), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement information (ACK/NACK) in response to the PUSCH is communicated by the PHICH. The EPDCCH is frequency-division-multiplexed with the PDSCH (downlink shared data channel) and used to communicate DCI and so on, like the PDCCH.

In the radio communication system 1, a UL data channel (PUSCH (Physical Uplink Shared CHannel), also referred to as a UL shared channel and/or the like), which is used by each user terminal 20 on a shared basis, an UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI (Uplink Control Information)), including at least one of delivery acknowledgment information (ACK/NACK) and radio quality information (CQI) and so on, is transmitted by the PUSCH or the PUCCH. By means of the PRACH, random access preambles for establishing connections with cells are communicated.

(Radio Base Station)

Figure 8:
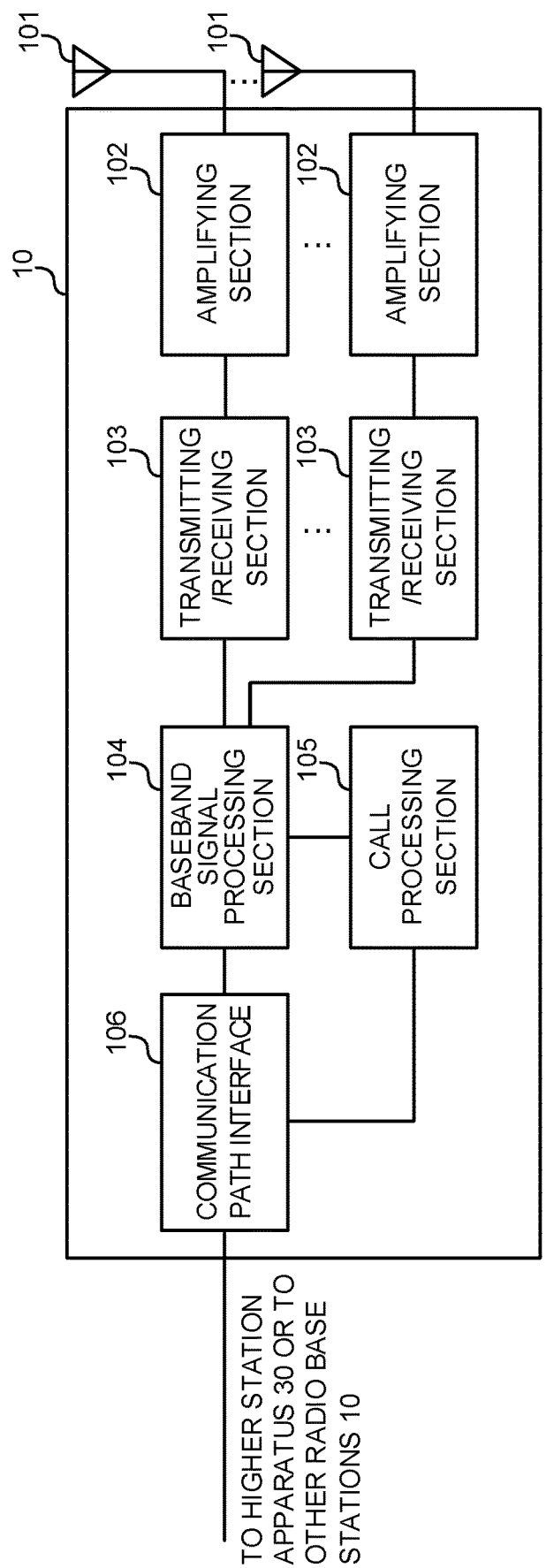
FIG. 8 is a diagram to show an exemplary overall structure of a radio base station according to the present embodiment.

FIG. 8 is a diagram to show an example of an overall structure of a radio base station according to present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

DL data to be transmitted from the radio base station 10 to a user terminal 20 is input from the higher station apparatus 30 to the baseband signal processing section 104, via the communication path interface 106.

In the baseband signal processing section 104, the DL data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to the transmitting/receiving sections 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals (for example, DL control signals (DL control channels), DL data signals (DL data channels, DL shared channels and so on), DL reference signals (DM-RS, CSI-RS and so on), discovery signals, synchronization signals, broadcast signals and so on), and receive UL signals (for example, UL control signals (UL control channels), UL data signals (UL data channels, UL shared channels and so on), UL reference signals and so on).

To be more specific, the transmitting/receiving sections 103 receive a UL signal and the UL reference signal for use for demodulating this UL signal, transmitted from a user terminal, by using the same transmission time interval or different transmission time intervals. In addition, the transmitting/receiving sections 103 report information about the allocation pattern of UL reference signals (DMRS) and UL data in a predetermined short TTI, to the user terminal. Furthermore, the transmission/receiving sections 103 may report information about the modulation scheme that the user terminal applies to the UL signal (for example, sPUSCH). The transmitting/receiving sections of the present invention are constituted by a transmitting/receiving section 103 and/or a communication path interface 106.

Figure 9:
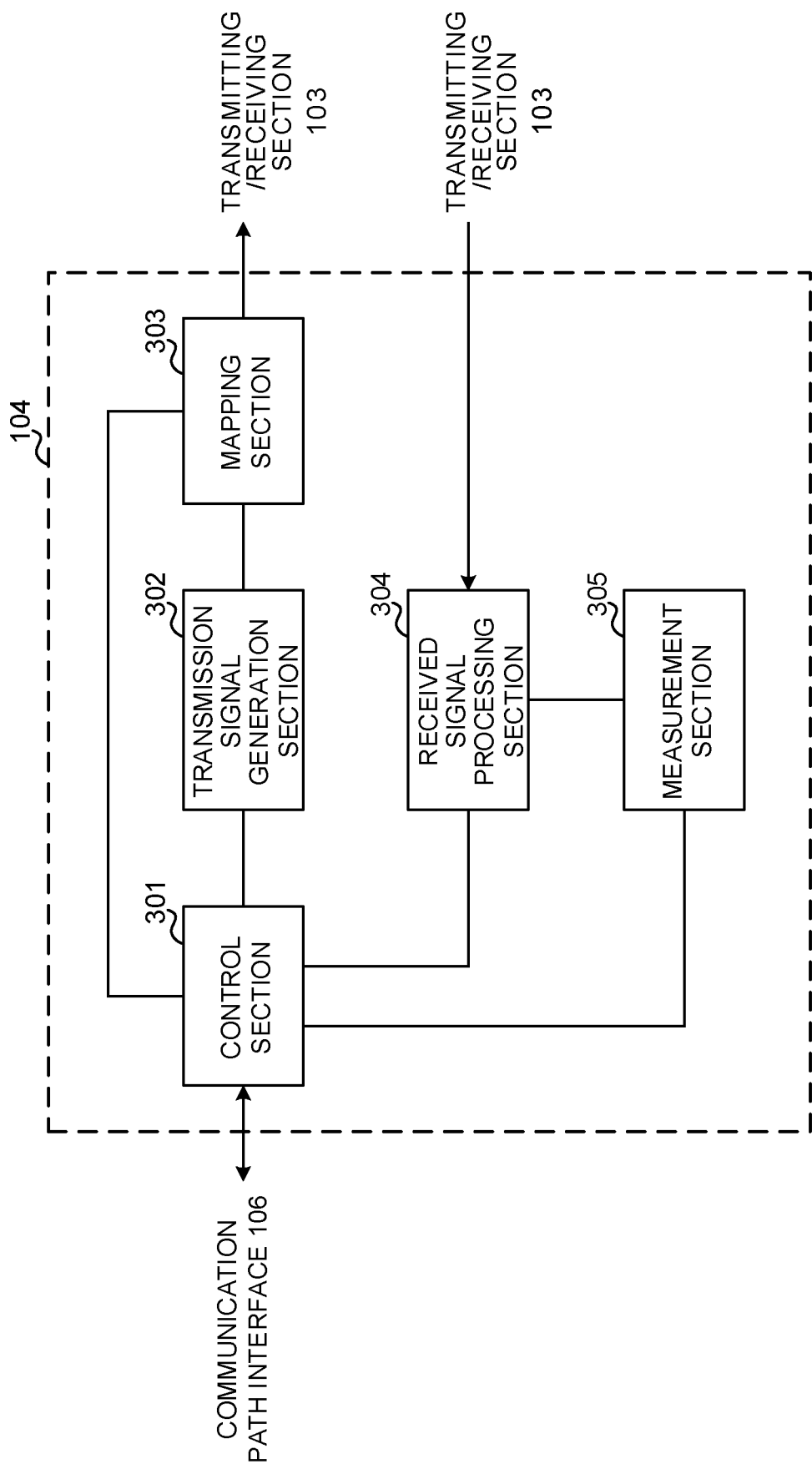
FIG. 9 is a diagram to show an exemplary functional structure of a radio base station according to the present embodiment.

FIG. 9 is a diagram to show an exemplary functional structure of a radio base station according to present embodiment. Note that, although FIG. 9 primarily shows functional blocks that pertain to characteristic parts of the present embodiment, the radio base station 10 may have other functional blocks that are necessary for radio communication as well. As shown in FIG. 9, the baseband signal processing section 104 at least has a control section 301, a transmission signal generation section 302, a mapping section 303, a received signal processing section 304 and a measurement section 305.

The control section 301 controls the whole of the radio base station 10. The control section 301 can be constituted by a controller, a control circuit or control apparatus that can be described based on general understanding of the technical field to which the present invention pertains.

The control section 301, for example, controls generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls scheduling (for example, resource allocation) of DL signals and/or UL signals. To be more specific, the control section 301 controls the transmission signal generation section 302, the mapping section 303 and the transmitting/receiving sections 103 to generate and transmit DCI (DL assignment) that includes DL data channel scheduling information and DCI (UL grant) that includes UL data channel scheduling information.

Also, the control section 301 exerts control so that one of the allocation patterns of UL data and DMRS shown in FIG. 3 and FIG. 4 is configured in a user terminal under the rule that channel estimation to use DMRSs across subframes and/or slots is not performed (rule 1) and the rule that channel estimation is not performed using DMRSs allocated to sTTIs behind the sTTI the corresponding UL data is allocated (rule 2).

The control section 301 configures either self-contained DMRSs or shared DMRSs in the user terminal by using higher layer signaling. Depending on the situation, the base station indicates the more DMRS preferable allocation between self-contained DMRSs and shared DMRSs, to the user terminal, by way of higher layer signaling.

When there is a command to configure only self-contained DMRSs in the user terminal, the control section 301 may configure self-contained DMRS allocation patterns in the user terminal by using higher layer signaling. If there are sTTIs to which the same self-contained DMRS allocation patterns are applied between the first slot and the second slot, the user terminal may be commanded, via higher layer signaling, to select and use one of these allocation patterns.

If a configuration to allow the use of a shared DMRS is indicated with respect to the user terminal, the control section 301 may report information about allocation pattern, to the user terminal, in the indicator field of the UL grant corresponding to the sTTI. One of a self-contained DMRS and a shared DMRS may be indicated by a UL grant's indicator field. Self-contained DMRS allocation patterns and shared DMRS allocation patterns may be defined, per sTTI, based on the bit data of the indicator field.

The control section 301 controls a UL signal and a UL reference signal so that they are allocated to the same sTTI or to different sTTIs. Also, the control section 301 may limit the modulation schemes to apply to UL signals (for example, sPUSCH) to phase shift modulation (for example, QPSK) and report these to the user terminal.

The transmission signal generation section 302 generates DL signals (DL control channels, DL data channels, DL reference signals such as DM-RSs, and so on) as commanded from the control section 301, and outputs the DL signals to the mapping section 303. The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources, as commanded from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals transmitted from the user terminals 20 (UL control channels, UL data channels, UL reference signals and so on). Based on an uplink reference signal that is transmitted from the user terminal, the received signal processing section 304 controls the demodulation process and/or other processes of the corresponding UL signal (for example, sPUSCH). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, the received signal processing section 304 outputs at least one of a preamble, control information and UL data, to the control section 301. Also, the received signal processing section 304 outputs the received signals, the signals after the receiving processes and so on, to the measurement section 305.

The measurement section 305 conducts measurements with respect to the received signal. The measurement section 305 can be constituted by a measurer, a measurement circuit or measurement apparatus that can be described based on general understanding of the technical field to which the present invention pertains.

The measurement section 305 may measure the received power (for example, RSRP (Reference Signal Received Power)), the received quality (for example, RSRQ (Reference Signal Received Quality)), channel states and so on of the received signals. The measurement results may be output to the control section 301.

(User Terminal)

Figure 10:
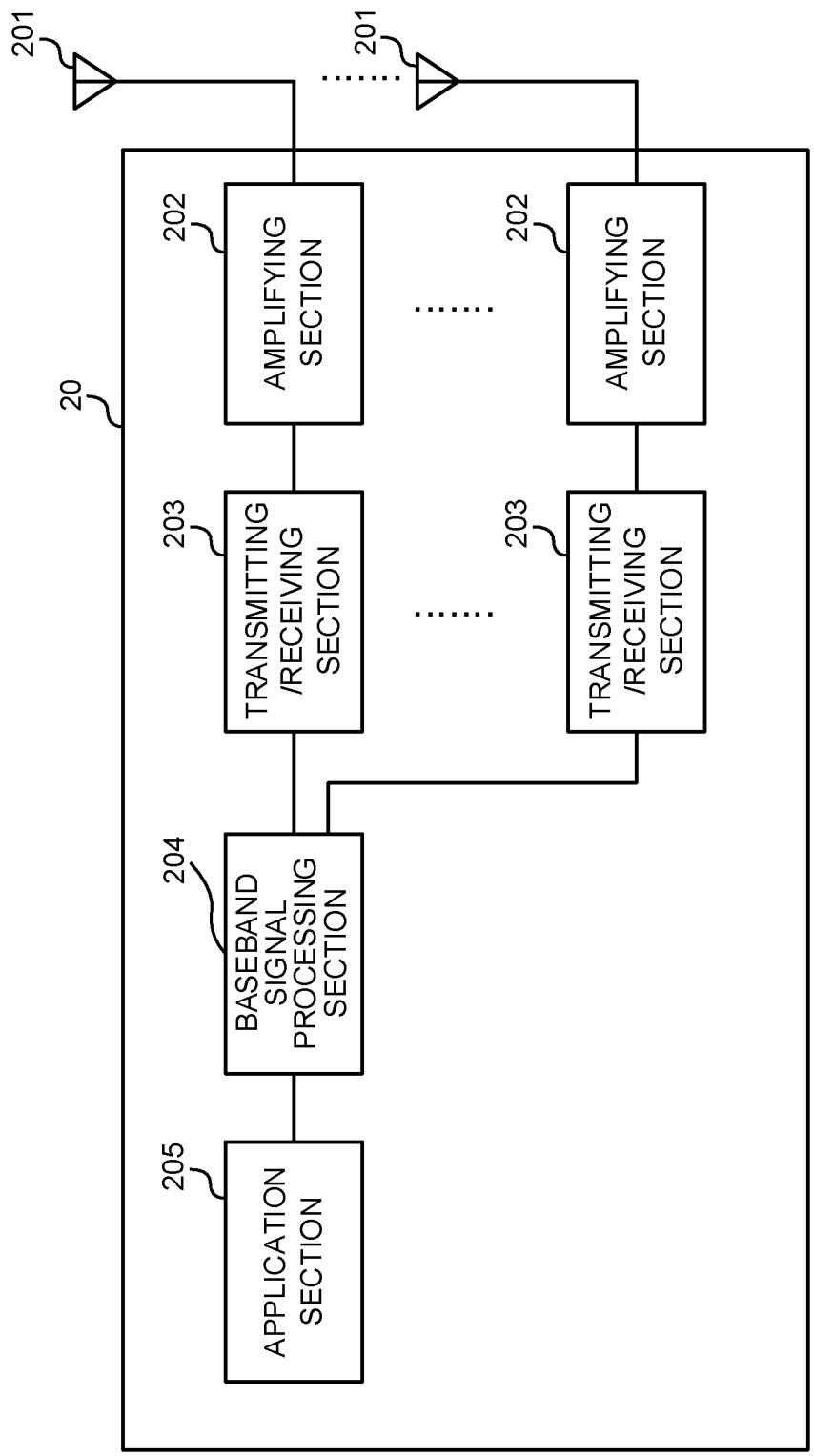
FIG. 10 is a diagram to show an exemplary overall structure of a user terminal according to the present embodiment.

FIG. 10 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. The DL data is forwarded to the application section 205. The application section 205 performs processes related to higher layers above the physical layer and the MAC layer, and so on. Also, in the DL data, system information and higher layer control information are also forwarded to the application section 205.

Meanwhile, UL data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive DL signals (for example, DL control signals (DL control channels), DL data signals (DL data channels, DL shared channels and so on), DL reference signals (DM-RS, CSI-RS and so on), discovery signals, synchronization signals, broadcast signals and so on), and transmit UL signals (for example, UL control signals (UL control channels), UL data signals (UL data channels, UL shared channels and so on), UL reference signals and so on).

To be more specific, the transmitting/receiving sections 203 transmits a UL signal and the UL reference signal for use for demodulating this UL signal, by using the same transmission time interval or different transmission time intervals. In addition, the transmitting/receiving sections 203 receives information about the location where the UL reference signal (DMRS) is allocated in a predetermined short TTI (DMRS pattern), to the user terminal. Furthermore, the transmission/receiving sections 203 may receive information about the modulation scheme that the user terminal applies to the UL signal (for example, sPUSCH). In addition, the transmitting/receiving sections 203 perform transmission so as not to allow the situation where only one of UL signal transmission and UL reference signal transmission overlaps between multiple cells (first example), or to allow this situation (second example).

Figure 11:
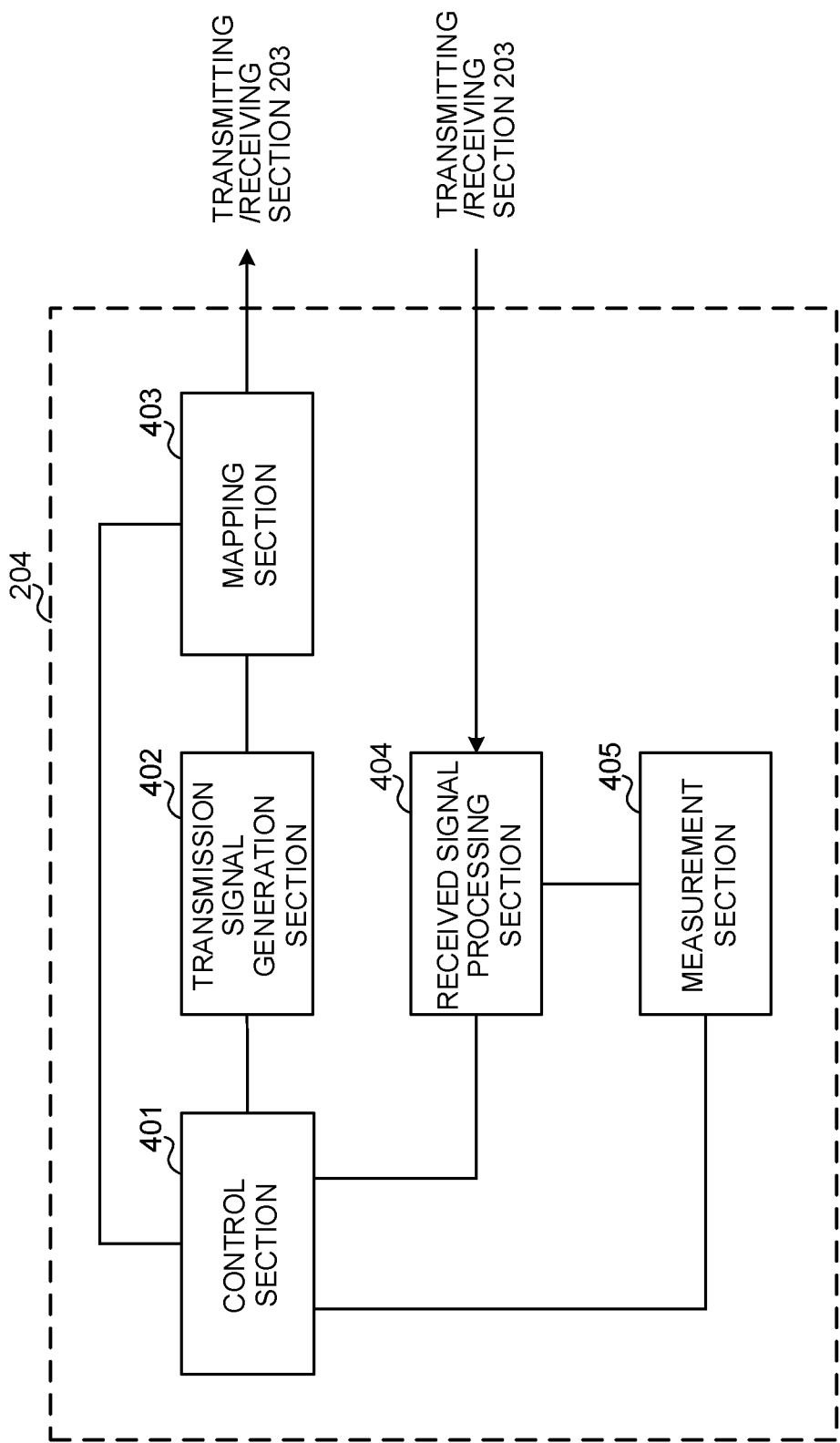
FIG. 11 is a diagram to show an exemplary functional structure of a user terminal according to the present embodiment.

FIG. 11 is a diagram to show an exemplary functional structure of a user terminal according to present embodiment. Note that, although FIG. 11 primarily shows functional blocks that pertain to characteristic parts of the present embodiment, the user terminal 20 has other functional blocks that are necessary for radio communication as well. As shown in FIG. 11, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 configures either self-contained DMRSs or shared DMRSs in the user terminal by using higher layer signaling. If a configuration to allow the use of a self-contained DMRS alone is applied, the control section 401 may assume that DCI does not include an indicator field that indicates the DMRS contained in a preceding sTTI. When there is a command to configure only self-contained DMRSs in the user terminal, the control section 301 may assume that self-contained DMRS allocation patterns are indicated by higher layer signaling.

If a configuration to allow the use of a shared DMRS alone is applied, the control section 401 assumes that the indicator field of the UL grant indicates the allocation pattern of UL data and the DMRS. The indicator field that indicates the allocation pattern of UL data and the DMRS is comprised of 2 bits or 3 bits, for example.

The control section 401 may interpret the indicator field of a UL grant differently depending on the sTTI in which the UL grant is scheduled. By linking the interpretation of the bit data provided in the indicator field with the scheduled sTTI, it is possible to use complex allocation patterns in an efficient way. For example, even if the bit data provided in the indicator field is the same, the allocation pattern of UL data and the DMRS can be changed depending on the sTTI that is scheduled.

Also, if a self-contained DMRS or a shared DMRS is configured via higher layer signaling, the control section 401 does not presume scheduling in which a DMRS and UL data are transmitted simultaneously in the same symbol (SC-FDMA symbol). Alternatively, the user terminal does not presume scheduling in which 2 DMRSs are transmitted simultaneously using different resources (for example, frequency resources) on the same symbol (SC-FDMA symbol). If a UL grant that commands simultaneous transmission of a DMRS and UL data in the same symbol or simultaneous transmission of 2 DMRSs is received, the previous UL grant command is overwritten with the latest UL grant command.

The control section 401 may indicate either a self-contained DMRS or a shared DMRS by using a UL grant's indicator field.

The control section 401 applies predetermined modulation schemes to UL signals and/or applies the same transmission power to a UL signal and a UL reference signal. In addition, the control section 401 applies phase shift modulation to a UL signal, applies different transmission power to a UL signal and a UL reference signal that are allocated non-contiguously in the time direction in a given cell. Furthermore, when the transmission power exceeds a predetermined value upon transmission of a UL signal and/or a UL reference signal, the control section 401 applies power scaling, independently, to the UL signal and the UL reference signal (see FIG. 4 and FIG. 5).

The transmission signal generation section 402 generates UL signals (UL control channels, UL data signals, UL reference signals and so on) as commanded from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

The mapping section 403 maps the UL signals generated in the transmission signal generation section 402 to radio resources as commanded from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, DL signals transmitted from the radio base station 10 (DL control channels, DL data channels, DL reference signals and so on). The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from control section 401, the received signal processing section 404 performs blind decoding of a DL control channel, which schedules transmission and/or receipt of a DL data channel, and performs receiving processes for the DL data channel based on this DCI. In addition, the received signal processing section 404 estimates channel gain based on the DM-RS or the CRS, and demodulates the DL data channel based on the estimated channel gain.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of data to the control section 401. Also, the received signal processing section 404 outputs the received signals, the signals after the receiving processes and so on, to the measurement section 405.

The measurement section 405 conducts measurements with respect to the received signals. For example, the measurement section 405 measures channel states based on reference signals (CSI-RSs) for channel state measurements, transmitted from the radio base station. The measurement section 405 may measure, for example, the received signals' received power (for example, RSRP), DL received quality (for example, RSRQ) and so on. The measurement results may be output to the control section 401. The measurement section 405 can be constituted by a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 12:
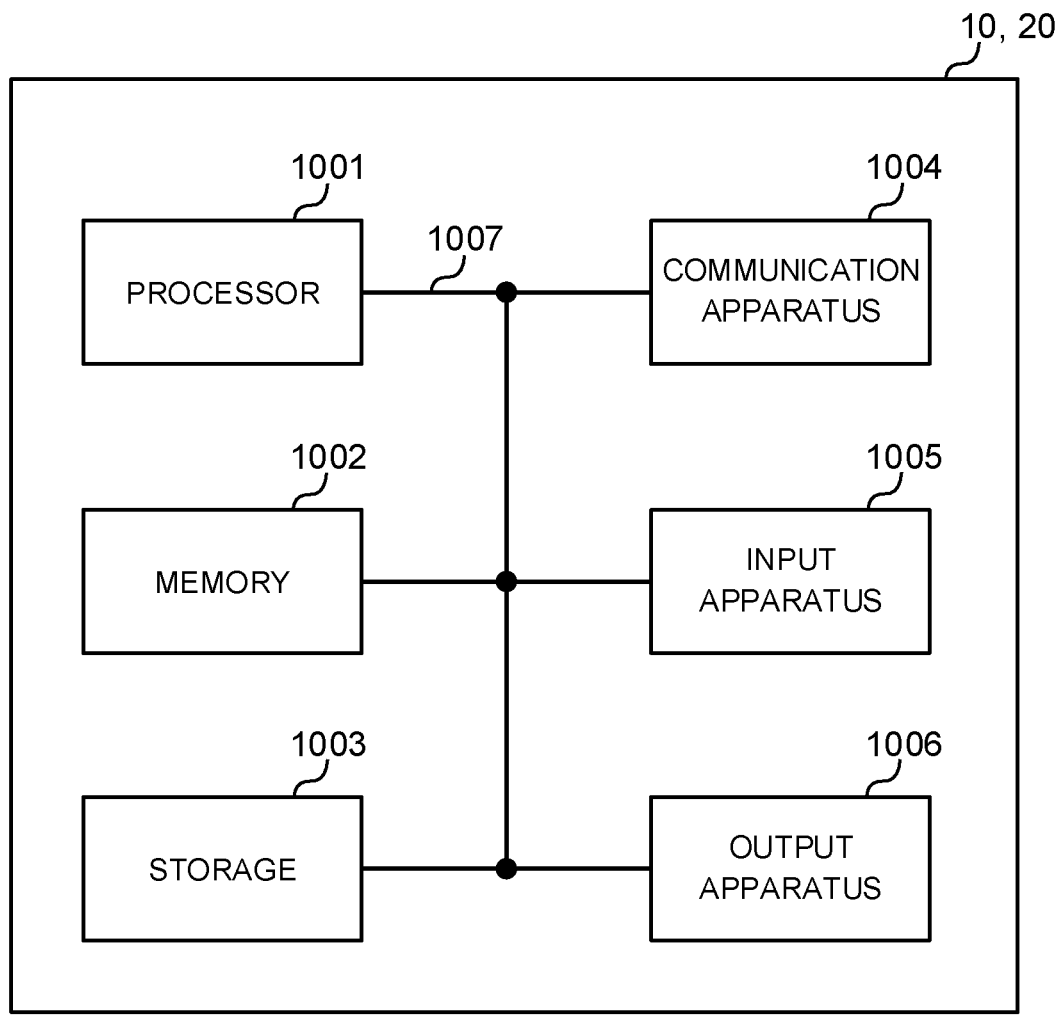
FIG. 12 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 12 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, 1 subframe may be referred to as a "transmission time interval (TTI)," or a plurality of consecutive subframes may be referred to as a "TTI," and 1 slot may be referred to as a "TTI." That is, a subframe and a TTI may be a subframe (1 ms) in existing LTE, may be a shorter period than 1 ms (for example, 1 to 13 symbols), or may be a longer period of time than 1 ms.

Here, a TTI refers to the minimum time unit of scheduling in radio communication, for example. For example, in LTE systems, a radio base station schedules radio resources (such as the frequency bandwidth and transmission power that can be used in each user terminal) to allocate to each user terminal in TTI units. Note that the definition of TTIs is by no means limited to this. TTIs may be transmission time units for channel-encoded data packets (transport blocks), or may be the unit of processing in scheduling, link adaptation and so on.

A TTI having a time length of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 subframe or 1 TTI in length. 1 TTI and 1 subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, 1 RE may be a radio resource field of 1 subcarrier and 1 symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a structure in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as "radio base stations." In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between 2 or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between 2 or more elements, and may include the presence of one or more intermediate elements between 2 elements that are "connected" or "coupled" to each other. The coupling or connection between the elements may be physical, logical or a combination thereof. As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
    a receiver that receives downlink control information (DCI) including pattern information indicating symbol locations to which physical uplink shared channel (PUSCH) and demodulation reference signal (DMRS) for PUSCH are mapped in a plurality of short transmission time intervals (sTTIs) that are shorter than a subframe; and
    a processor that controls mapping of the PUSCH and the DMRS to the symbol locations based on the pattern information,
    wherein the processor controls transmission of the DMRS based on a first DCI including a first pattern information for a first sTTI among the plurality of the sTTIs, if the first pattern information indicates a mapping of the DMRS to a symbol of a second sTTI following the first sTTI and if a second pattern information contained in a second DCI for the second sTTI does not indicate a mapping of the DMRS to the symbol.

2. The terminal according to claim 1, wherein the symbol is a first symbol of the second sTTI.

3. The terminal according to claim 2, wherein the subframe contains two slots, and the processor maps the DMRSs to first symbols of the leading sTTIs in each slot.

4. The terminal according to claim 1, wherein the subframe contains two slots, and the processor maps the DMRSs to first symbols of the leading sTTIs in each slot.

5. A radio communication method for a terminal, comprising the steps of:
    receiving downlink control information (DCI) including pattern information indicating symbol locations to which physical uplink shared channel (PUSCH) and demodulation reference signal (DMRS) for PUSCH are mapped in a plurality of short transmission time intervals (sTTIs) that are shorter than a subframe; and
    controlling of mapping of the PUSCH and the DMRS to the symbol locations based on the pattern information,
    wherein the controlling includes controlling of a transmission of the DMRS based on a first DCI including a first pattern information for a first sTTI among the plurality of the sTTIs, if the first pattern information indicates a mapping of the DMRS to a symbol of a second sTTI following the first sTTI and if a second pattern information contained in a second DCI for the second sTTI does not indicate a mapping of the DMRS to the symbol.

6. A base station comprising:
    a transmitter that transmits downlink control information (DCI) including pattern information indicating symbol locations to which physical uplink shared channel (PUSCH) and demodulation reference signal (DMRS) for PUSCH are mapped in a plurality of short transmission time intervals (sTTIs) that are shorter than a subframe; and
    a receiver that receives the PUSCH and the DMRS that are transmitted on symbol locations to which the PUSCH and the DMRS are mapped based on a first pattern information contained in a first DCI for a first sTTI among the plurality of the sTTIs, if the first pattern information indicates a mapping of the DMRS to a symbol of a second sTTI following the first sTTI and if a second pattern information contained in a second DCI for the second sTTI does not indicate a mapping of the DMRS to the symbol.

7. A system comprising:
    a terminal that comprises:
        a receiver that receives downlink control information (DCI) including pattern information indicating symbol locations to which physical uplink shared channel (PUSCH) and demodulation reference signal (DMRS) for PUSCH are mapped in a plurality of short transmission time intervals (sTTIs) that are shorter than a subframe; and
        a processor that controls mapping of the PUSCH and the DMRS to the symbol locations based on the pattern information,
        wherein the processor controls transmission of the DMRS based on a first DCI including a first pattern information for a first sTTI among the plurality of the sTTIs, if the first pattern information indicates a mapping of the DMRS to a symbol of a second sTTI following the first sTTI and if a second pattern information contained in a second DCI for the second sTTI does not indicate a mapping of the DMRS to the symbol; and
    a base station that comprises:
        a transmitter that transmits the DCI to the terminal; and
        a receiver that receives the PUSCH and the DMRS that are transmitted on symbol locations to which the PUSCH and the DMRS are mapped based on the first pattern information.

* * * * *